(12) United States Patent
Moran et al.

(10) Patent No.: US 9,185,463 B2
(45) Date of Patent: Nov. 10, 2015

(54) SYSTEM AND METHOD FOR PROVIDING PERSONALIZED CHANNEL SETTING TO SOCIAL TELEVISION VIEWER

(71) Applicant: COMIGO LTD., Yarkona (IL)

(72) Inventors: Dov Moran, Kfar Saba (IL); Motty Lentzitzky, Raanana (IL)

(73) Assignee: Comigo Ltd., Yarkona (IL)

( * ) Notice: Subject to any disclaimer, the term of this patent is extended or adjusted under 35 U.S.C. 154(b) by 66 days.

(21) Appl. No.: 14/076,288

(22) Filed: Nov. 11, 2013

(65) Prior Publication Data

US 2014/0137147 A1    May 15, 2014

Related U.S. Application Data

(60) Provisional application No. 61/724,992, filed on Nov. 11, 2012.

(51) Int. Cl.

| | |
|---|---|
| H04N 7/173 | (2011.01) |
| H04N 5/445 | (2011.01) |
| H04N 21/475 | (2011.01) |
| H04N 21/4627 | (2011.01) |
| H04N 21/442 | (2011.01) |
| G06F 21/00 | (2013.01) |
| H04N 21/4788 | (2011.01) |
| G06F 21/10 | (2013.01) |
| G06F 21/62 | (2013.01) |
| G06Q 50/00 | (2012.01) |

(52) U.S. Cl.
CPC ............ *H04N 21/4755* (2013.01); *G06F 21/00* (2013.01); *G06F 21/10* (2013.01); *G06F 21/6245* (2013.01); *G06Q 50/01* (2013.01); *H04N 21/44204* (2013.01); *H04N 21/4627* (2013.01); *H04N 21/4751* (2013.01); *H04N 21/4788* (2013.01); *G06F 2221/0775* (2013.01); *G06F 2221/2135* (2013.01)

(58) Field of Classification Search
CPC .................... H04N 21/4627; H04N 21/44222; H04N 21/4788; H04N 21/4316
See application file for complete search history.

(56) References Cited

U.S. PATENT DOCUMENTS

| | | | |
|---|---|---|---|
| 6,732,372 B2* | 5/2004 | Tomita et al. | 725/47 |
| 2004/0231003 A1* | 11/2004 | Cooper et al. | 725/135 |
| 2007/0199025 A1* | 8/2007 | Angiolillo et al. | 725/47 |
| 2009/0293079 A1* | 11/2009 | McKee et al. | 725/10 |
| 2011/0126258 A1* | 5/2011 | Emerson et al. | 725/133 |
| 2011/0246572 A1* | 10/2011 | Kollenkark et al. | 709/204 |
| 2012/0030586 A1* | 2/2012 | Ketkar | 715/751 |

* cited by examiner

*Primary Examiner* — Benjamin R Bruckart
*Assistant Examiner* — Carmine Malangone
(74) *Attorney, Agent, or Firm* — Yagod Morris & Associates

(57) ABSTRACT

A method of sharing usage data of multimedia content is provided. The method comprises providing a set of media channels, providing access, to one or more pre-selected remote users, to usage data regarding consumption of the multimedia content, and selectively restricting access of at least a portion of the usage data to at least a portion of the remote users.

11 Claims, 7 Drawing Sheets ance Nov. 11, 2012, the contents of which are incorporated by reference in their entirety.

SYSTEM AND METHOD FOR PROVIDING PERSONALIZED CHANNEL SETTING TO SOCIAL TELEVISION VIEWER

CROSS-REFERENCE TO RELATED APPLICATIONS

This application claims the benefit of priority from U.S. Provisional Patent Application No. 61/724,992, filed Nov. 11, 2012, the contents of which are incorporated by reference in their entirety.

FIELD OF THE INVENTION

The disclosure herein relates to providing personalized settings for sharing viewed channels of a social media user. In particular, the disclosure relates to the ability of providing members of a social group, the functionality to decide if usage of a specific channel is recorded and/or accessible to other online social network members.

BACKGROUND OF THE INVENTION

Television sets have become commonplace in homes, businesses and institutions offering diversified digital content, with viewing considered as a passive and relaxing experience, limited to the place itself.

During the last few years, with advancement of technology, various developments have been made to provide television services on a social basis taking advantage of the relationship between individuals, connecting users watching public television content in different locations. The vast amount of new electronic display devices adds to social television the concept of shared-viewing trends in creating a shift in television viewing from passive to active experience.

Social television introduced advanced technology which combines communication and social environment in the context of watching digital content, enabling the most common social television activity of watching digital content with others, allowing instant sharing of favorite digital media content with a social group. Such systems may, for example, provide text chat, indicating the presence and context consciousness, integrate voice communication, viewing of recommendations, ratings or video-conferencing related to viewing digital content either directly on screen or by using supplementary devices.

Furthermore, the media viewing experience is turning richer with video content becoming available on increasingly diverse devices such as television, personal computers, tablets, mobile communication devices, telephones, hand held devices and the like. In parallel, the social environment is changing, taking advantage of new emerging technologies and yielding a whole new world of experiences. Television broadcasting networks continue to deliver digital content in diverse areas of interest, answering different tastes and flavors. Combining the digital media, specifically the television as a platform, with the social environment increases the demand for sharing digital content and views.

Television is a wide reaching vehicle and a highly significant player in the digital media content domain. Recent studies of consumer behavior and television measurements (eMarketer—Digital Intelligence, Nielsen) claim that 99% of American households watch television on a regular basis, with the average adult spending more time watching television than surfing the internet. The report reveals that in 2010, the average adult spent about four and half hours per day watching television, compared to an average of just two and a half hours per day spent online.

Additionally, the percentage of American homes having at least one television set is reaching 99%, with two thirds of them owning at least three sets. These numbers highlight the fact that television is still a most widespread and premier entertainment platform.

SUMMARY OF THE INVENTION

It is an advantage of the current disclosure that an additional mode of operation is provided to allow controlling the exposure of media channel information, specifically limiting access to current usage or recorded history data, with minimal impact on user privacy.

While social television becomes more popular the exposure of media channel information may go beyond user expectations. Users may want to control what is exposed to others and to what extent, specifically related to information of the channel currently viewed and more generally, control the exposure of the current usage or recorded data history of accessing all or specific media channels. Such user control may provide functionality of blocking others completely or partially from accessing such recorded data.

Additionally, such control functionality may provide abilities of blocking access to currently viewed channels, removing the existing recorded data history, ceasing recording of such data or providing functionality of setting permissions for specific users or user groups of different social spaces.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard-disk, flash-drive, removable media or the like, for storing instructions and/or data.

Optionally, a network connection may additionally or alternatively be provided. User interface devices may be provided such as visual displays, audio output devices, tactile outputs and the like. Furthermore, as required, user input devices may be provided such as keyboards, cameras, microphones, accelerometers, motion detectors or pointing devices such as mice, roller balls, touch pads, touch sensitive screens or the like.

Optionally, a system may include a client terminal such as a set-top-box, mobile communication device or the like, which is operable to receive user defined preferences, monitor available media content and to control the input media renderer accordingly.

A set-top box (STB), referred to herein, may comprise an information appliance that connects to a television set and an external source of signal, decoding that signal into content that can be presented on a television unit or other display device.

Optionally, the media renderer may be selected from a group consisting of: televisions, media players, tablet computers, computers, digital picture frames, hand held devices and the like. Where required, the client terminal may be selected from a group consisting of: set-top-boxes, mobile communication devices, remote control devices and telephones and the like.

The interaction with the user may be applied via a friendly user interface that may be driven by a management module. Additionally, it may work in different possible architectures, for example using a network based approach to allow remote activities, or a locally managed approach.

In any of the above possible system architectures, the interests of a viewer in such a media socializing environment, may be reflected through a user preference profile, for example. User preference profile may serve for storing user preferences, privacy data, social groups, social spaces and the like.

User groups and social spaces may be classified, for example, according to various preferences, tastes or interests of the user interacting and communicating in such a social environment. Any member of a user space, may be authorized, by assigning permission to view shared recorded content. This open access to shared data may be limited or narrowed by user profile definitions or may partially exclude specific user classified groups from viewing a part of the user social space data, by limiting access to current usage or recorded data history of media channels accessed.

Optionally, the user preference profile may be created and configured manually or automatically. Manual configuration may designate categories of interests and the like, while automatic configuration may require machine learning algorithms or statistical analysis tools to deal with its complexity and high dimensionality.

According to one aspect of the presently disclosed subject matter, there is provided a method of sharing usage data of multimedia content, the method comprising:
  providing a set of media channels;
  providing access, to one or more pre-selected remote users, to usage data regarding consumption of the multimedia content; and
  selectively restricting access of at least a portion of the usage data to at least a portion of the remote users.

The method may further comprise:
  defining one or more remote user categories;
  assigning at least some of the pre-selected remote users to the remote user categories; and
  defining, for at least one or more of the remote user categories, access restrictions of at least a portion of the usage data for remote users assigned to the one or more remote user categories.

The method may further comprise:
  defining one or more media categories;
  assigning at least some of the media channels to the media categories; and
  defining, for at least one or more of the media categories, access restrictions of at least a portion of the usage data for media channels assigned to the one or more media categories.

The method may further comprise:
  defining one or more remote user categories and one or more media categories;
  assigning at least some of the pre-selected remote users to the remote user categories, and at least some of the media channels to the media categories; and
  defining, for at least one or more combinations of one of the remote user categories and one of the media categories, access restrictions of at least a portion of the usage data relating to media channels assigned to the media category, for remote users assigned to the remote user category.

The usage data may be selected from at least one of the group consisting of viewing history, recording history, user comments, and combinations thereof.

The selectively restricting access may be based on at least one of a time schedule and programming. For example, a user may selectively restrict access to at least some usage data for viewing and/or recording during a predefined time, irrespective of programming, channel, etc., thereby basing it on a time schedule. Additionally or alternatively, a user may selectively restrict access to at least some usage data relating to a particular program, irrespective of scheduling or of which media channel it appears on, thereby basing it on programming.

According to another aspect of the presently disclosed subject matter, there is provided a computer implemented method for sharing usage data of multimedia content, the method comprising at least one processor executing instructions to perform the following operations:
  providing a set of media channels;
  providing access, to one or more pre-selected remote users, to usage data regarding consumption of the multimedia content; and
  selectively restricting access of at least a portion of the usage data to at least a portion of the remote users.

The computer implemented method may further comprise:
  defining one or more remote user categories;
  assigning at least some of the pre-selected remote users to the remote user categories; and
  defining, for at least one or more of the remote user categories, access restrictions of at least a portion of the usage data for remote users assigned to the one or more remote user categories.

The computer implemented method may further comprise:
  defining one or more media categories;
  assigning at least some of the media channels to the media categories; and
  defining, for at least one or more of the media categories, access restrictions of at least a portion of the usage data for media channels assigned to the one or more media categories.

The computer implemented method may further comprise:
  defining one or more remote user categories and one or more media categories;
  assigning at least some of the pre-selected remote users to the remote user categories, and at least some of the media channels to the media categories; and
  defining, for at least one or more combinations of one of the remote user categories and one of the media categories, access restrictions of at least a portion of the usage data relating to media channels assigned to the media category, for remote users assigned to the remote user category.

The usage data may be selected from at least one of the group consisting of: viewing history, recording history, user comments and combinations thereof.

The selectively restricting access may be based on at least one of a time schedule and programming.

According to a further aspect of the presently disclosed subject matter, there is provided a system for sharing usage data of multimedia content comprising a communication network in communication with a plurality of client terminals, the communication network comprising at least one central unit processor operable to:
  provide access, to one or more client terminals, to usage data regarding consumption of the multimedia content; and
  selectively restrict access of at least a portion of the usage data to at least a portion of the client terminals.

The central processing unit may be further operable to:
  define one or more remote user categories;
  assign at least some of the pre-selected remote users to the remote user categories; and
  define, for at least one or more of the remote user categories, access restrictions of at least a portion of the usage data for remote users assigned to the one or more remote user categories.

The central processing unit may be further operable to:
  define one or more media categories;
  assign at least some of the media channels to the media categories; and define, for at least one or more of the media categories, access restrictions of at least a portion of the usage data for media channels assigned to the one or more media categories.

The central processing unit may be further operable to:

define one or more remote user categories and one or more media categories;

assign at least some of the pre-selected remote users to the remote user categories, and at least some of the media channels to the media categories; and define, for at least one or more combinations of one of the remote user categories and one of the media categories, access restrictions of at least a portion of the usage data relating to media channels assigned to the media category, for remote users assigned to the remote user category.

The usage data may be selected from at least one of the group consisting of: viewing history, recording history, user comments and combinations thereof.

The selectively restricting access may be based on one or more of a time schedule and programming.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the various selected embodiments may be put into practice. In the accompanying drawings.

DETAILED DESCRIPTION OF THE INVENTION

Figure 1:
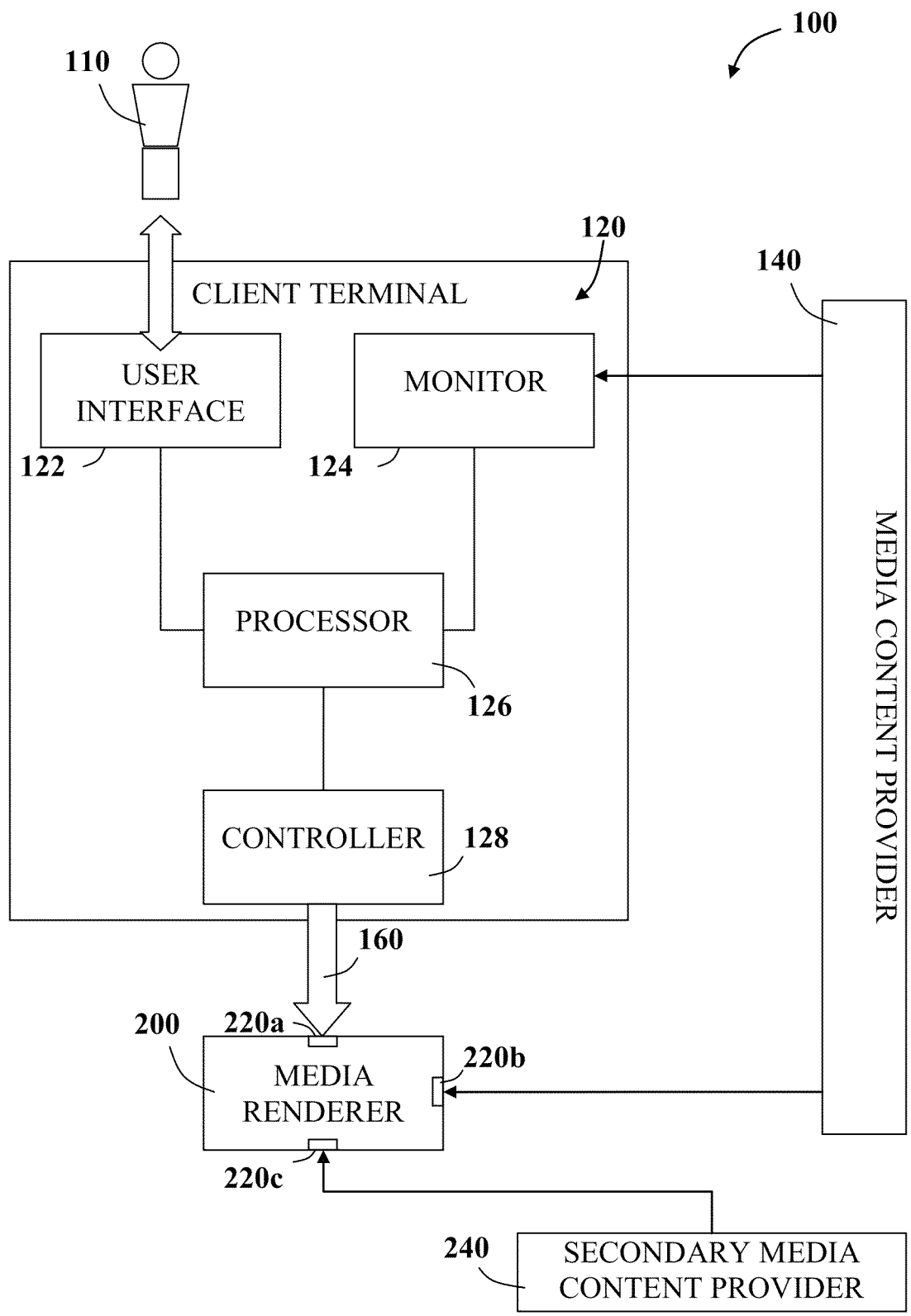
FIG. 1 is a block diagram representing one possible configuration of selected elements of a system for content based control of a media renderer with local processing.

With reference to FIG. 1, a block diagram is shown representing the major components of one possible configuration of selected elements of a system 100 for content based control of a media renderer 200, with functionality of managing social interactivity in media viewing environment, locally processed and managed. The system 100 includes a client terminal 120 in communication with a media content provider 140 and connected to the media renderer 200 via a communication channel 160. The client terminal 120 includes a processor 126 and may include additional components such as a controller 128, a user interface 122, and a media monitor 124.

Optionally the user interface 122 of the client terminal 120 may be configured to allow a media consumer 110 to set preferences used by the system 100 to select control signals sent to the media renderer 200. Various user interfaces 122 configured to facilitate inputting data to the client terminal 120 by the user 110 are known in the art, such as keyboards, touch screens, remote controls, pointing devices, etc. Optionally, the media renderer 200 may serve as at least part of the user interface 122, for example by providing an output screen and/or an input device.

The processor 126 of the content-based control system 100 is operable to receive media content data from the media monitor 124, and to record a user profile. The user profile may contain data related, e.g., to media content accessed, and/or other relevant information.

The controller 128 may select control signals which it sends to the media renderer 200.

It is noted that the media renderer may comprise a plurality of connector ports 220a, 220b, 220c which may be connected to a number of media sources. For example, a first port 220a may be connected to the client terminal 120; a second port 220b may be connected to the media content provider 140 and a third port 220c may be connected to a secondary media content provider 240.

The management of privacy data, categorization of media channels or user groups, and current usage or recorded history data of accessing a media channel, may be controlled by the user viewing profile, for example, generated by a software package running on the client terminal processor 126. Such a profile may reflect the categories and preferences of viewing throughout the day or over longer time periods. This viewing profile may be stored locally or may be sent to the media content provider for remote storage.

In some embodiments, a media stream may be accessed directly by the media renderer 220, for example via the second input port 220b. It will be appreciated that where the client terminal 120 is connected to the media renderer 200 via the first port 220a, it will not have control over content accessed via the second input port 220b.

By way of illustration only, control signals may use the Consumer Electronics Control (CEC) feature available for example with HDMI connections or the like. The CEC feature may allow a controller 128 to command and control the media renderer 200 by sending control signals via the client terminal 120. For example, CEC Routing Control allows a user to control the switching of signal sources between input channels.

Where required, the controller 128 may be operable to send control signals switching the input channel of the media renderer 200 to the first input port 220a as required. Accordingly, a personalized advert stream may be sent from the client terminal 120 to the media renderer 200 via the first input port 220a for the duration of the advertising break in the media content stream. Optionally the system may be further operable to switch access back to the second port 220b at the end of the advertising break, alternatively, the media content stream may be provided to the media renderer 200 via the client terminal 120.

The user's profile of viewing preferences may use categorized context based on the nature of the media channels, social groups and social spaces. For example, sport related media channels may be categorized under a 'SPORT CHANNELS' category of social space. User group members may also be clustered into categories, groups, circles or the like. For example, a user may select members interested in leisure activities and group them in a 'LEISURE USER GROUP' user's category, or categorize them according to his social relationship therewith, such as "WORK", "FRIENDS", "FANTASY SPORTS LEAGUE", etc.

Additionally, privacy data and access to current usage or recorded history data for any of the available media channels or their categorization may be stored in the user's preference profile. This may allow the limiting of exposure or access to this information to any other group member of any social space.

Optionally, limiting access may be effected by blocking access to current usage or recorded access history data for a specific media channel.

Optionally, limiting access may be effected by preventing the recording of usage data of a specific media channel or removing the channel altogether.

Optionally, the aforementioned limitations may be applied for at least one media channel or a set of media channels either selected manually or applied to a category encapsulating a group of media channels.

Optionally, the aforementioned limitations may be applied for at least one user group of social space specified by its group name, for example, or be applied to all members of all social spaces.

Figure 2:
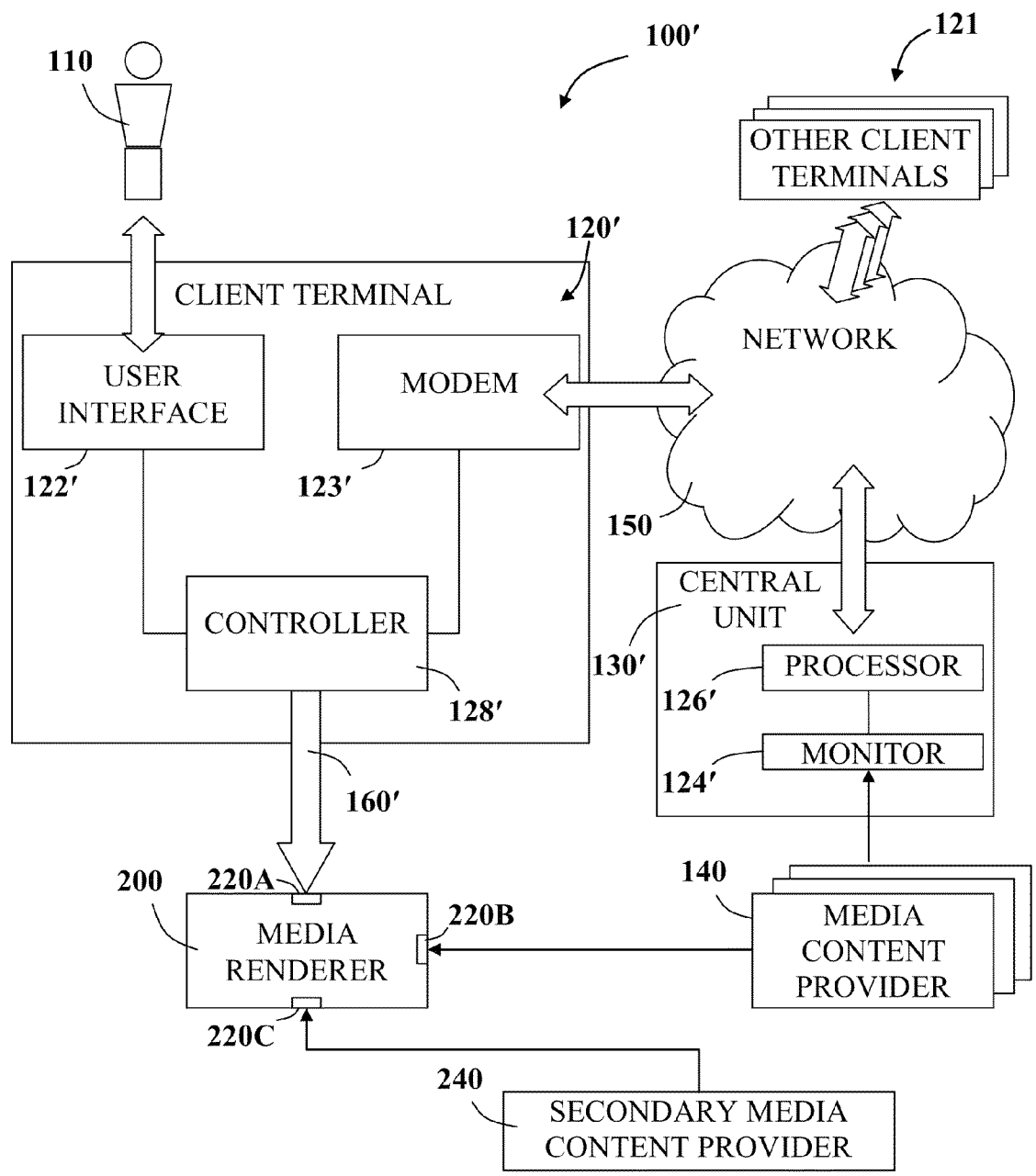
FIG. 2 is a block diagram representing another possible configuration of a network-based distributed system for content based control of a media renderer with central processing and FIG. 3 is a flowchart representing possible selected actions of a method for limiting access to current usage or recorded history data of a media channel in a social TV or other media environment.

Referring now to FIG. 2, showing another possible block diagram configuration for a network-based distributed system 100' for content based control of a media renderer 200 with added functionality of hybrid advertising, centrally processed and managed. The network-based distributed system 100' includes a client terminal 120' and a central unit 130' in communication with a network 150, such as the World Wide Web, or a local area network or other such networked computing system.

The central unit 130' may allow certain functionality of advertising processing of the system 100' to be performed remotely and communicated to the client terminal 120' via a modem 123' providing a connection to the network 150. For example, the central unit 130' may be operable to receive media content data from a media monitor 124', and to record a user profile related to media content accessed. The central unit 130' may further have a processor 126' receiving information, such as the current viewer preferences profile (with targeting characteristics) created locally on the client terminal 120' or TV associated events from the client terminal 120' to process and update viewer preference profile (with targeting characteristics) on the central unit 130', controlling advertising content sent to this client terminal.

It is further noted that the central unit 130' may communicate with other client terminals 121. Accordingly, media data may be shared among multiple client terminals 120', 121. Where such data sharing is enabled, a social network may be established, for example, allowing users to form social contacts. Where appropriate, a user's social contacts may be provided with permission to access, e.g., in real time, usage data relating to the user's currently viewed channels, which may include, but it not limited to, the user's channel usage history, future usage schedule, preferences, and/or other relevant information. Such channel usage data may be selectively blocked from social contacts.

Although two different architectures are described herein, those skilled in the art will understand that other technologies may be used to implement the disclosed method of controlling advertising content.

Figure 3:
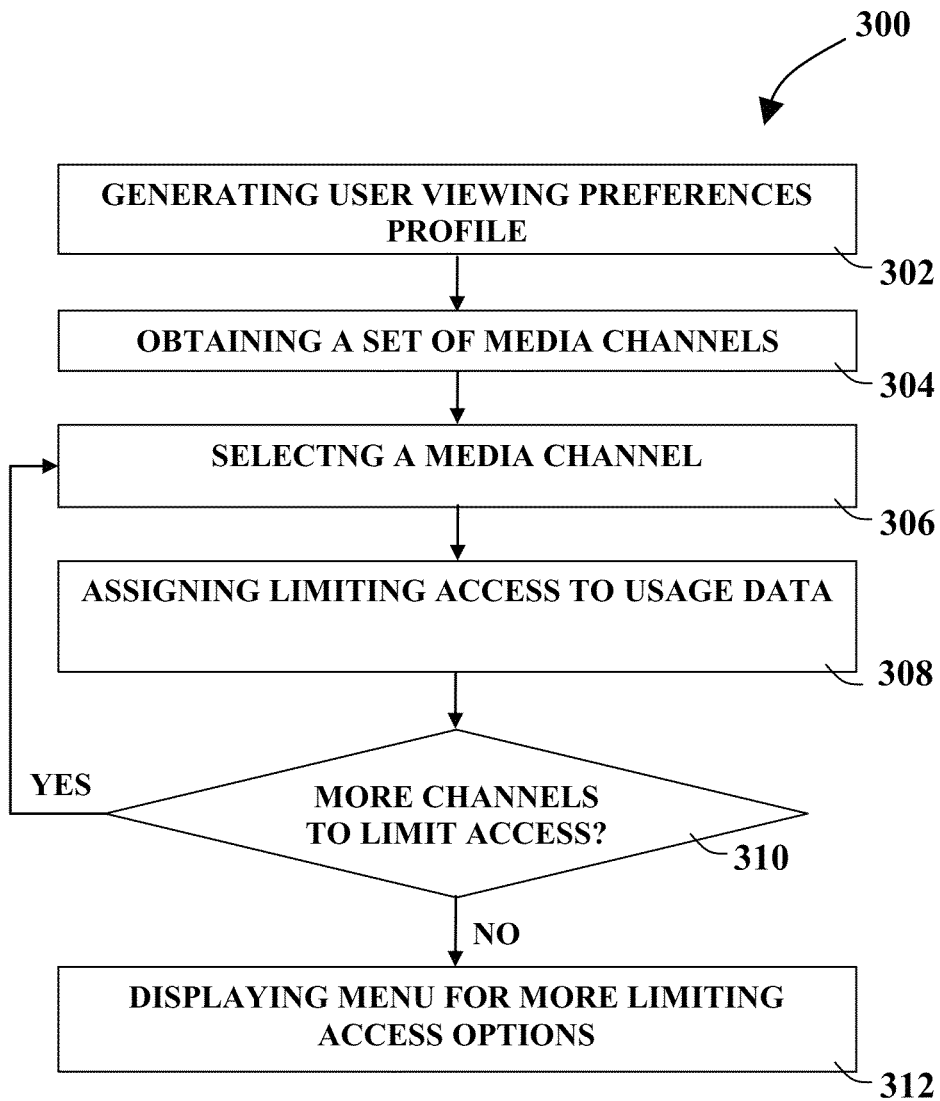

As illustrated in FIG. 3, an example of a method 300 is provided for limiting access to usage data. The usage data may include, but is not limited to, information related to current usage, future schedule, recorded history data, preferences, etc., of a specific media channel in a social TV or other media environment. The method 300 may be used in content based control of a media renderer management system, such as described hereinabove.

In step 302, a user viewing profile is generated for collecting user behavior data and for storing user preferences. This behavior data may include, but is not limited to, one or more of viewing preferences, availability of media channels preferences, current usage and/or recorded history data preferences for media channel access, and user space categorization.

In step 304, a set of media channels available for viewing on the client terminal is obtained. The set may be determined, for example, by a content provider in accordance with a package of channels purchased in advance.

In step 306, a specific channel is selected from the set obtained in step 304. In step 308, the selected channel is assigned a limiting access setting for usage data. The usage data may include, but is not limited to, current usage, future schedule, and recorded history data. The limiting access setting may be selected from a group including, but not limited to, blocking access to history data, stopping recording of access data, removing the recorded data, etc.

In step 310, a decision is made based on whether or not more channels remain to be assigned a limited access setting. If so (i.e., the decision for step 310 is "yes"), a further channel is selected, as described above with respect to step 306, and the selected channel is assigned a limiting access setting as described above with respect to step 308.

When the decision is reached in step 310 (e.g., after sufficient iterations of the steps 306 and 308 as described above are carried out) that no more channels remain to be assigned a limiting access setting, i.e., the decision for step 10 is "no", the method 300 may optionally proceed to step 312, wherein a menu is displayed providing additional functionality of limiting access.

Optionally, the content of the limiting access settings data may be stored locally, for example, in a memory of the STB, additionally or alternatively, the data may be transmitted to the central unit for storage.

The content based control of a media renderer management system may be configured to run locally on a processor of a client terminal, as indicated in FIG. 1, or may run on a remote processor of a central unit of a network based system, as indicated in FIG. 2. Applying access limitation is applicable to any of the system architectures brought as examples hereinabove.

It may be noted that for network based architecture such as indicated in FIG. 2, some of the analytics may be performed on the controller of the terminal client. This may, for example, generate and maintain a local viewer preference profile.

Alternatively or additionally the system may send data pertaining to usage such as a viewer's watching behavior to the central unit and a viewer preference profile may be generated and maintained remotely.

Figure 4:
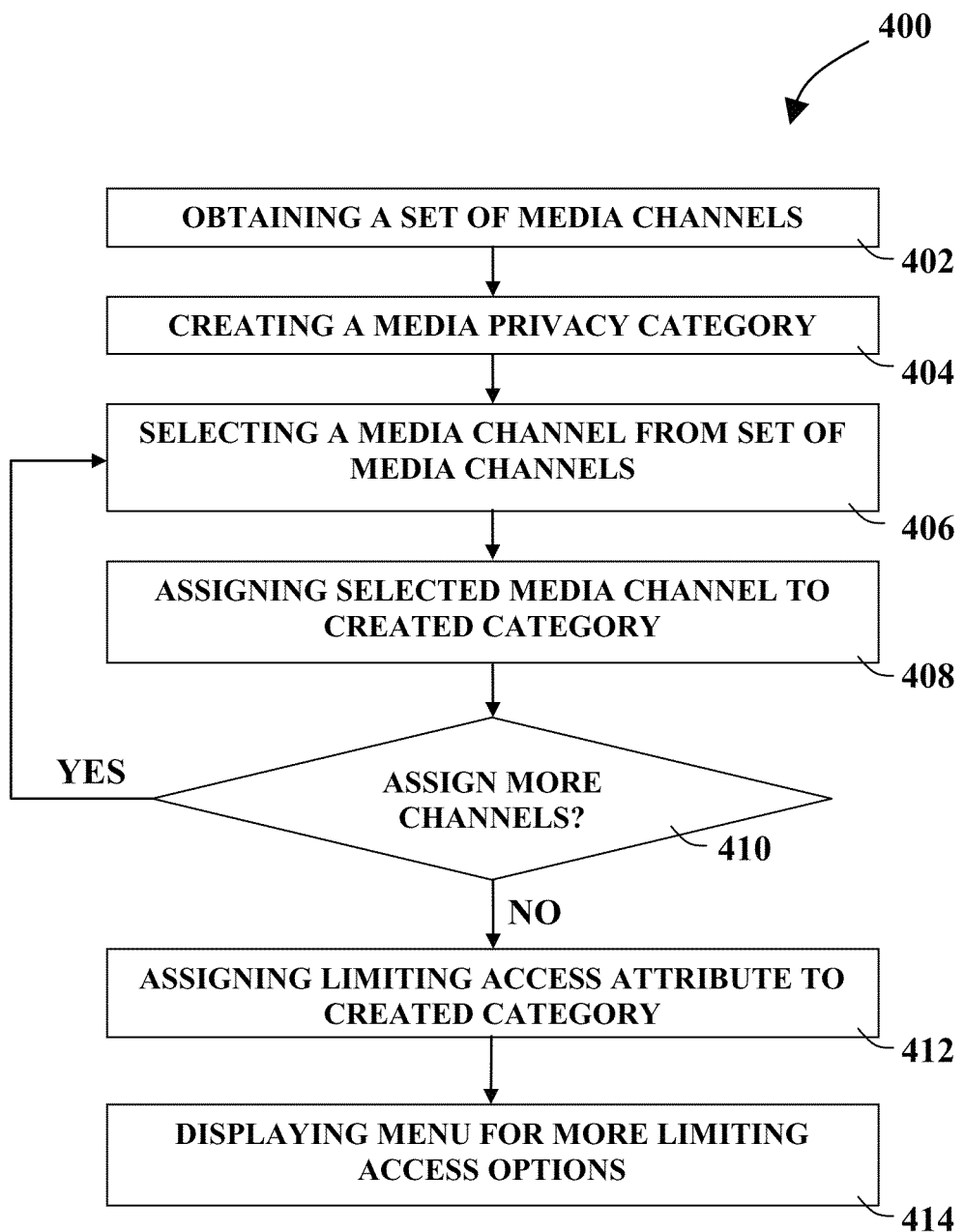
FIG. 4 is a flowchart representing possible selected actions of a method for limiting access to current usage or recorded history data of an assigned media channel category in a social TV or other media environment.

As illustrated in FIG. 4, another example of a method 400 for limiting access to usage data is provided. The usage data may include, but is not limited to, information related to current usage, future schedule, recorded history data, preferences, etc., of an assigned media channel category in a social TV or other media environment. The method 400 may be used in a content based control of a media renderer management system, such as described hereinabove.

In step 402, a set of media channels available for viewing on the client terminal is obtained, for example based on an existing user viewing profile.

In step 404, one or more media privacy categories are defined. Such categories may be given titles selected by the user, for example representing a desired social space, such as 'SPORTS', 'HISTORY', 'FASHION', 'LEISURE', etc.

In step 406, a channel is selected from the available set of media channels obtained in step 402. In step 408, the selected media channel is assigned to one of the categories created in step 404.

In step 410, a decision is made based on whether or not more media channels are to be assigned to the media privacy category created in step 404. If so (i.e., the decision for step 410 is "yes"), another media channel is selected as described above with reference to step 406, and, as described above with reference to step 408, the selected channel is assigned to one of the categories as described with reference to step 404.

When the decision is reached in step 410 (e.g., after sufficient iterations of the steps 406 and 408 as described above are carried out) that no more channels remain to be assigned to one of the categories, i.e., the decision for step 10 is "no", the method 400 proceeds to step 412, wherein a limiting access attribute is assigned to all media channels in one or more of the media privacy categories.

In step 414, a menu is optionally displayed providing additional available functionality related to limiting access.

Figure 5A:
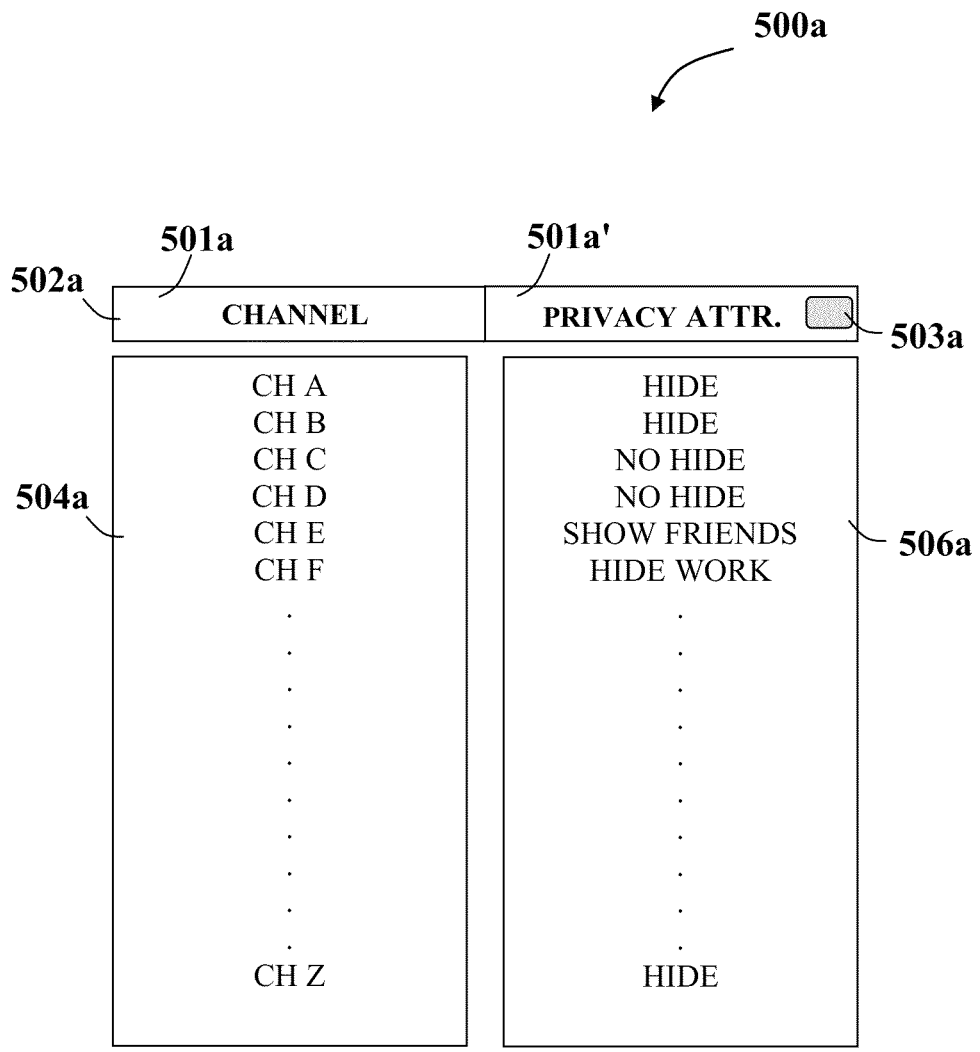
FIGS. 5A-5C are a set of tables representing a possible assignment of privacy settings to media channels in the context of limiting access to media channel data in a social TV or other media environment.

FIG. 5A illustrates an example of a table 500a for assignment of privacy settings to media channels in the context of limiting access to usage data. The usage data may include, but is not limited to, current usage, future schedule, recorded history data, etc., relating to a media channel in a social TV or other media environment.

The table 500a includes a title bar 502a, a media channel column 504a, and a privacy attribute column 506a. The table 500a may, for example, be presented to a user as part of the graphical user interface allowing the user to assign privacy settings for selected channels.

The title bar 502a comprises column headings 501a, 501a' and a 'select-all' box 503a. The column headings indicate, for each media channel, its current privacy attribute setting. The 'select-all' box 503a facilitates assigning 'HIDE' privacy attribute to all available media channels, by indicating a single box.

The media channel column 504a may list all accessible media channels on the client terminal of the user, or a subset thereof.

The privacy attribute column 506a may list, for each accessible media channel, the privacy attribute. Available privacy attributes may include, but are not limited to, 'HIDE', 'NO-HIDE', and attributes which social groups are granted/denied access.

The two columns of the table 500a represent the set of available media channels 504a and the settings 506a of an attribute representing the privacy setting or accessibility to usage data relating to the associated media channel. A 'HIDE' setting may prevent usage data from being accessible, for example the usage history may not be recorded. A 'NO-HIDE' setting may determine that no limitation is placed upon the accessibility of usage data. A title bar 502a may further include a 'HIDE ALL' box 503a. Selecting the 'select-all' box 503a may set all media channels of the set to the 'HIDE' setting thereby limiting access to usage data. Other privacy settings may be provided such as a CLOAK setting, for example, which may deliberately provide a false trail of usage data, such as recording a false history for the time during which a selected channel is accessed. Still further privacy settings will be readily apparent to those skilled in the art.

Figure 5B:
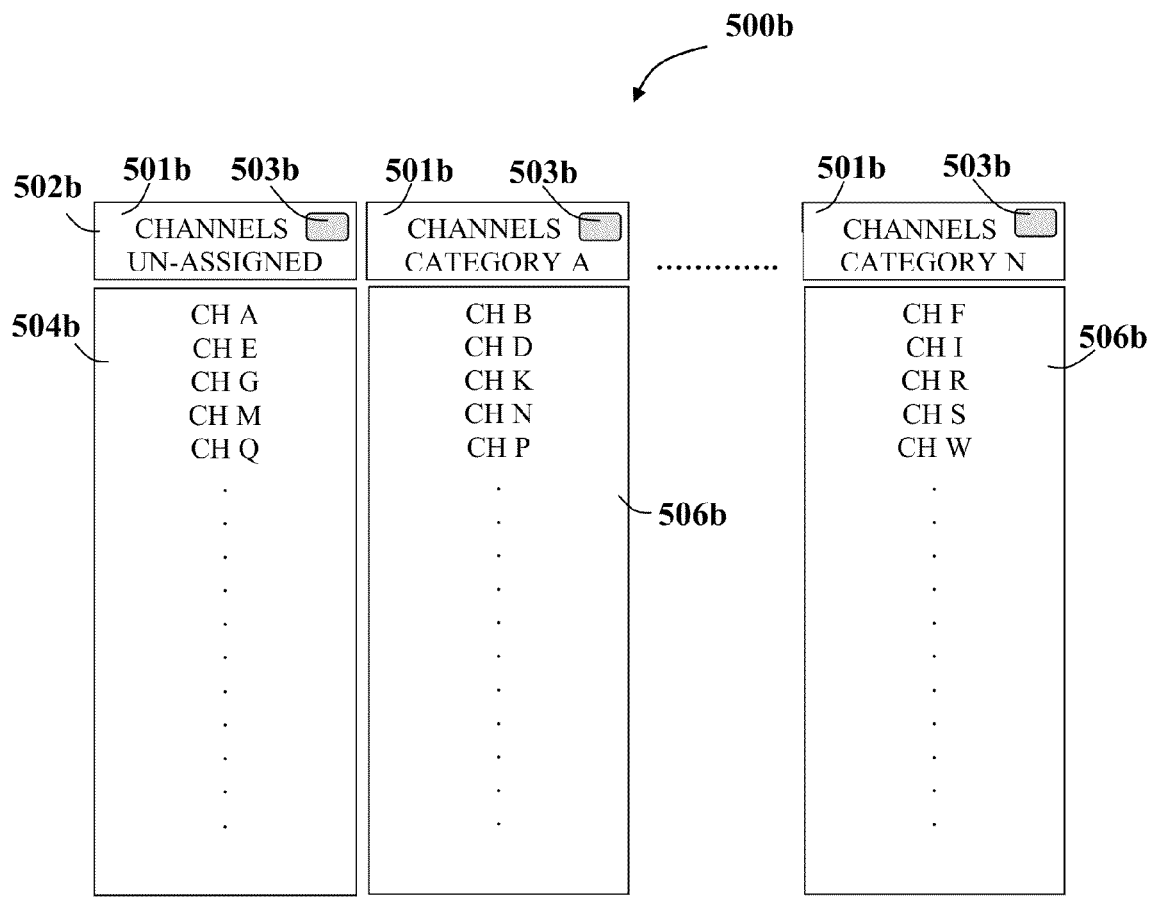

FIG. 5B illustrates an example of table 500b for media channel classification of social-space categories for assignment of privacy settings in the context of limiting access to media channel usage data of all media channels associated with the social-space category in a social TV or other media environment.

The table 500b comprises a title bar 502b, several social-space category columns 506b (it will be appreciated that although two social-space category columns 506b are illustrated in FIG. 5B, the table 500b may include as many as are required), and a set of channels 504b not assigned to any social-space category. The table 500b may be presented to a user as part of the graphical user interface allowing the user to assign privacy settings to a social-space category, e.g., to all associated media channels.

Each title bar 502b comprises a column heading 501b, e.g., indicating the relevant social-space category and associated media channels, and a 'select-all' box 503b.

The social-space category columns 506b may list all accessible media channels on the client terminal of the user associated with a social-space category. The unassigned category column may list all media channels not assigned yet to any social space category.

Optionally, it is noted that a media channel may be assigned to more than a single social space category.

The table 500b may be presented to a user as part of the graphical user interface allowing the user to assign privacy attributes to a social space category. Such categories may be given titles selected by the user, for example, representing the desired social space category, such as 'SPORTS', 'HISTORY', 'FASHION', 'LEISURE', etc.

Selecting the 'select-all' box 503b in the title of the setting attribute of a specific social-space category, may be used, for example, to set all media channels of the set to block viewing to the recorded usage data.

It is noted that additional social-space category columns 506b may be created by the user for each new social space category.

Figure 5C:
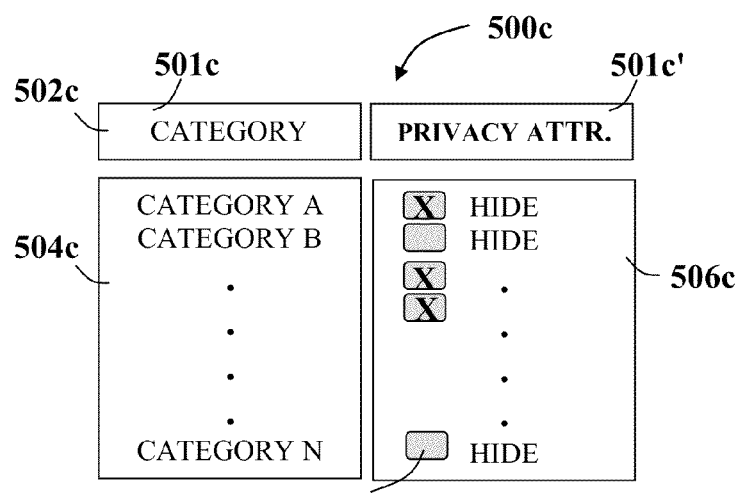

FIG. 5C illustrates an additional interface for providing a similar functionality of assigning privacy an attribute to a classified set of media channels.

The table 500c comprises a title bar 502c, a separate social-space category column 504c and a privacy attribute column 506c.

The title bar 502c comprises column headings 501c and 501c' for the social space category and for the privacy attribute, respectively.

The column of privacy attribute settings 506c includes a 'select-all' box 503c for each social space category entry in column 504c. The column headings indicate a social space category and the associated privacy attribute settings.

The table 500c may be presented to a user as part of the graphical user interface allowing the user to assign privacy attributes to a social space category. Such categories may be given titles selected by the user, for example, representing the desired social space category, such as 'SPORTS', 'HISTORY', 'FASHION', 'LEISURE', etc.

Selecting the 'select-all' box 503c in the column of privacy attribute 506c, for a specific social space category may be used to blocking access to recorded usage data of all media channels associated with the social space category selected, for example.

Optionally, it is noted that a media channel may be assigned to more than a single social space category.

Figure 6:
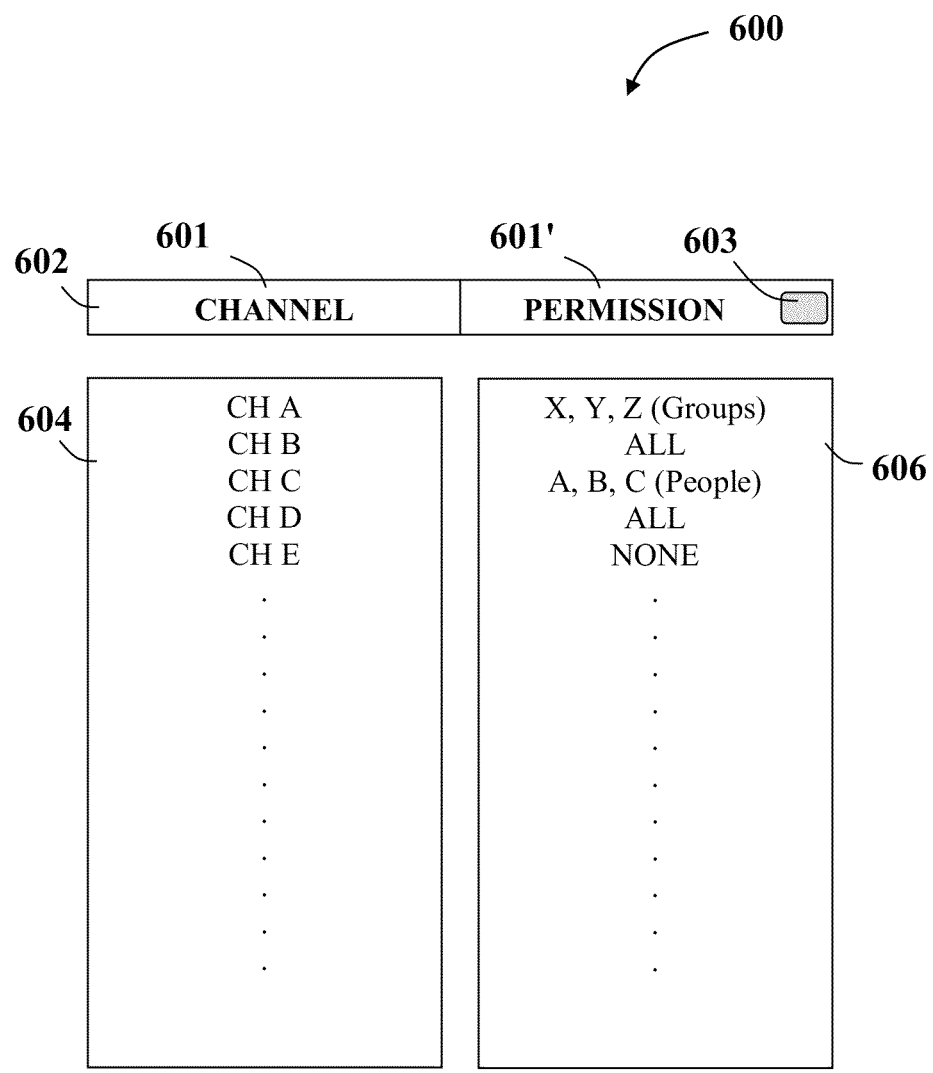
FIG. 6 is a table representing a possible assignment of privacy settings to media channels for providing personalized access permission to media channel data in a social TV or other media environment.

FIG. 6 illustrates a further example of a table 600 which may be used as a graphical user interface. The table 600 presents selected actions of a method for providing personalized access permissions to media channel usage data, such as current usage, future schedule, recorded history data, preferences or the like, in a social TV or other media environment.

The table 600 includes a title bar 602, a media channel column 604, and a permission attribute column 606. The table 600 may be presented to a user as part of the graphical user interface for assigning permission settings to selected users, lists of users or user groups to allow or to disallow access to recorded usage data, for example.

The title bar 602 consists of column headings 601 for available media channels and 601' for specifying associated permission, and a 'permit-all' box 603. The column headings indicate for each media channel its current permission settings. The 'permit-all' box 603 may allow assigning 'ALL' permission, to all media channels, allowing access to recorded usage data to all available media channels.

The media channel column 604 may list all accessible media channels on the client terminal of the user.

The permission attribute column 606 may list for each accessible media channel, the appropriate permission, including, but not limited to, 'ALL', 'NONE', a specific user, and a list of users or a specific user group.

The two columns of table 600 of represent a column of available media channels set 604 and a column of permission attributes settings 606, for each media channel, representing allowed or disallowed accessibility to usage data of the associated media channel. A 'NONE' setting may disable accessibility to media channel usage data, for example. An 'ALL' setting may determine that no limitation is placed upon the accessibility of usage data, for example. A title bar 602 may further include a 'permit-all' box 603. Selecting the 'permit-all' box 603 may set all media channels permission attribute to 'ALL' setting thereby allowing access to the usage data to all. Other permission settings may be provided such as allowing specific user/users, identified possibly by their system ID or name, to view specific history usage data of media channels or allow accessibility to users of a specific social group, identified by its assigned group ID or group name. Still further permission settings will be readily apparent to those skilled in the art.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

What is claimed is:

1. A method for use in a system comprising a plurality of client terminals in communication with each other, said method for operating said client terminals in an improved manner such that usage data of multimedia content is shared between a plurality of remote users associated with said client terminals, the method comprising:
   defining one or more remote user categories and one or more media categories;
   providing a set of media channels each providing multimedia content to a first one of said client terminals associated with a first user;
   storing usage data related to media content provided to said first user in a storage device;
   assigning at least a portion of said remote users to said remote user categories, and at least a portion of said media channels to said media categories;
   defining a group of remote users selected according to at least one of said remote user categories and said media categories;
   defining, for at least one or more combinations of one of the remote user categories and one of the media categories, access restrictions of at least a portion of said usage data relating to media channels assigned to the media category, for remote users assigned to the remote user category;
   providing access, to one or more of said group of remote users, to said usage data; and
   selectively restricting access, automatically and based on said access restrictions, of at least a portion of said usage data to at least a portion of said remote users.

2. The method according to claim 1, wherein said usage data is selected from at least one of the group consisting of: viewing history, recording history, user comments and combinations thereof.

3. The method according to claim 1, wherein said selectively restricting access is based on a time schedule.

4. The method according to claim 1, wherein said selectively restricting access is based on programming.

5. A computer implemented method for use in a system comprising a plurality of client terminals in communication with each other via a communication network, said method for operating said client terminals in an improved manner such that usage data of multimedia content is shared between a plurality of remote users associated with said client terminals, said method comprising:
   defining one or more remote user categories and one or more media categories;
   providing a set of media channels each providing multimedia content to a first one of said plurality of client terminals associated with a first user;
   storing usage data related to media content provided to said first user in a storage device;
   assigning at least a portion of said remote users to said remote user categories, and at least a portion of said media channels to said media categories;
   defining, for at least one or more combinations of one of the remote user categories and one of the media categories, access restrictions of at least a portion of said usage data relating to media channels assigned to the media category, for remote users assigned to the remote user category;
   providing access via said network, to one or more of a group of remote users selected according to said user categories, to said usage data; and
   selectively restricting access, automatically and based on said access restrictions, of at least a portion of said usage data to at least a portion of said remote users.

6. The computer implemented method according to claim 5, wherein said usage data is selected from at least one of the group consisting of: viewing history, recording history, user comments and combinations thereof.

7. The computer implemented method according to claim 5, wherein said selectively restricting access is based on a time schedule.

8. The computer implemented method according to claim 5, wherein said selectively restricting access is based on programming.

9. A system for sharing usage data of multimedia content comprising a communication network and a plurality of client terminals in communication with each other via said communication network, said communication network comprising at least one central unit processor to operate said client terminals, in an improved manner such that usage data of multimedia content is shared between a plurality of remote users associated with said client terminals, to:
   define one or more remote user categories and one or more media categories;
   provide a set of media channels each providing multimedia content to a first one of said client terminals associated with a first user;
   store usage data related to media content provided to said first user in a storage device;
   assign at least a portion of said remote users to said remote user categories, and at least a portion of said media channels to said media categories;
   define, for at least one or more combinations of one of the remote user categories and one of the media categories, access restrictions of at least a portion of said usage data relating to media channels assigned to the media category, for remote users assigned to the remote user category;
   provide access via said network, to one or more of a group of remote users selected according to said user categories, to said usage data;
   selectively restrict access, automatically and based on said access restrictions, of at least a portion of said usage data to at least a portion of said remote users.

10. The system according to claim 9, wherein said usage data is selected from at least one of the group consisting of: viewing history, recording history, user comments and combinations thereof.

11. The system according to claim 9, wherein said selectively restricting access is based on one or more of a time schedule and programming.

* * * * *